United States Patent
Leach

(10) Patent No.: US 11,490,764 B2
(45) Date of Patent: Nov. 8, 2022

(54) CONVEYOR SPEED CONTROL SYSTEM

(71) Applicant: Hatco Corporation, Milwaukee, WI (US)

(72) Inventor: Jefferson Leach, Milwaukee, WI (US)

(73) Assignee: Hatco Corporation, Milwaukee, WI (US)

( * ) Notice: Subject to any disclaimer, the term of this patent is extended or adjusted under 35 U.S.C. 154(b) by 366 days.

(21) Appl. No.: 15/971,771

(22) Filed: May 4, 2018

(65) Prior Publication Data

US 2018/0317709 A1    Nov. 8, 2018

Related U.S. Application Data

(60) Provisional application No. 62/502,359, filed on May 5, 2017.

(51) Int. Cl.
*A47J 37/08* (2006.01)

(52) U.S. Cl.
CPC ....... *A47J 37/0835* (2013.01); *A47J 37/0857* (2013.01)

(58) Field of Classification Search
CPC .. A47J 37/0835; A47J 37/0857; A47J 37/044; A47J 37/045; A47J 37/1214; A21B 1/48
USPC ........................................................ 219/388
See application file for complete search history.

(56) References Cited

U.S. PATENT DOCUMENTS

| | | | |
|---|---|---|---|
| 4,430,698 A * | 2/1984 | Harris | G05B 5/01 700/42 |
| 5,102,674 A * | 4/1992 | Lehman | A47J 37/1266 426/523 |
| 5,300,757 A * | 4/1994 | Hara | A47J 27/62 219/497 |
| 6,056,781 A * | 5/2000 | Wassick | G05B 13/048 700/28 |
| 6,624,396 B2 * | 9/2003 | Witt | A21B 1/42 219/388 |
| 10,660,466 B2 * | 5/2020 | Yazvin | A47J 36/00 |
| 2011/0048244 A1 * | 3/2011 | Wiker | A21B 1/245 99/331 |

* cited by examiner

*Primary Examiner* — Erin E McGrath
(74) *Attorney, Agent, or Firm* — Foley & Lardner LLP

(57) ABSTRACT

A toaster includes a housing, a conveyor configured to support food products, a motor configured to drive the conveyor to move the food products through the housing, a heating element disposed adjacent the conveyor and configured to emit thermal energy toward the food products as the food products are moved through the housing, a temperature sensor configured to sense a temperature within the housing, and a controller operatively coupled to the temperature sensor and configured to control the motor to drive the conveyor at a conveyor speed. The controller is configured to store the sensed temperature within the housing as a function of time and calculate a derivative of the sensed temperature with respect to time. The controller is configured to vary the conveyor speed based on a value of the derivative.

20 Claims, 7 Drawing Sheets

CONVEYOR SPEED CONTROL SYSTEM

CROSS-REFERENCE TO RELATED PATENT APPLICATION

This application claims the benefit of U.S. Provisional Patent Application No. 62/502,359, filed May 5, 2017, which is incorporated herein by reference in its entirety.

BACKGROUND

Conveyor toasters typically include a housing, a heat source within the housing, and a conveyor configured to move food products through the toaster, whereby the food products are heated or toasted by the heat source. The use of an endless conveyor to move food products through the toaster typically increases the processing capacity of conveyor toasters over other types of toasters. The degree to which food products are heated depends on the temperature within the conveyor toaster and the time period during which food products are heated (which is a function of conveyor speed). Thus, to control the degree of heating, conveyor toasters typically provide operator controls configured to adjust the toaster temperature or conveyor speed.

Different types of conveyor toasters are known. For example, conveyor toasters are commonly used to toast food products including bread, buns, bagels, muffins and waffles. A full line of electric conveyor toasters is made, for example, by Hatco Corporation of Wisconsin. These conveyor toasters, which include both vertical and horizontal models, include a toaster housing, electric heating elements mounted within the toaster housing, and an endless conveyor which moves food products adjacent to the heating elements such that the food products are toasted. The food products can be placed directly on the conveyor of a horizontal toaster, or can be held within a food-carrying basket of either a vertical or horizontal toaster. Food products are manually loaded through an opening in the housing, are toasted as they are moved past the heating elements by the endless conveyor, and are discharged into a product receiving tray located at the bottom of the housing.

Conveyor toasters are one type of conveyor oven. Other types of conveyor ovens for processing food products include, for example, conveyorized pizza ovens, microwave ovens and tunnel ovens. However, conveyor ovens may also be used to heat products other than food. For example, conveyor ovens may be used to cure rubber sheets or to dry ink on printed materials. Control over the degree of heating in each type of conveyor oven is typically accomplished by varying the oven temperature or the conveyor speed. Although the description below is focused on conveyor toasters, the disclosure herein is intended to cover (and is applicable to) other types of conveyor ovens.

In some conveyor toasters using analog conveyor speed control systems, conveyor speed is controlled by an operator using a variable-resistance device (e.g., a rheostat) in parallel with a diode. The rheostat-diode forms part of a speed control circuit which controls the speed of an AC electric motor driving the conveyor using gears. The degree of toasting is set by appropriate adjustment of the rheostat. An increase in resistance causes the speed control circuit to decrease the conveyor speed, thereby increasing the degree of toasting. Conversely, a decrease in resistance of the rheostat causes an increase in conveyor speed, thereby decreasing the degree of toasting. The operator adjusts the rheostat setting such that the food product being processed is properly heated or toasted. An example of a conveyor toaster having such a speed control circuit is the TK-105E product made by Hatco Corp.

The temperature at which food products processed by certain conveyor toasters are heated depends on the status of the toaster's electric heating elements. For example, in the TK-105E product made by Hatco Corp., one set of elements is always powered while a second set is switched on and off by a temperature-controlled switch (e.g., thermostat). The second set of elements is switched off when the temperature exceeds the threshold temperature setting of the thermostat, and is switched on when the temperature drops below the threshold. Thus, the temperature is regulated about the threshold setting of the thermostat. The thermostat does not affect the speed of the conveyor.

Despite having control circuits for controlling the conveyor speed and heating elements, such conveyor toasters are unable to control the degree to which food products are heated under certain conditions. For example, assume a speed control circuit is adjusted to properly toast a given load of food products. Then, assume a higher load of food products is introduced. The load increase will cause a drop in temperature, and the thermostat may cause additional heating elements to switch on. After a time, the additional elements will provide additional heat to compensate for the higher load. However, the additional elements may need a significant time period to heat up. For example, metal-sheathed electric heating elements commonly used in such toasters require 3-4 minutes to reach their operating temperatures. During this period, food products being processed will receive an insufficient amount of heat energy and may be undertoasted.

Attempted solutions to this problem have been to increase the power of the additional heating elements or to switch on more heating elements using the thermostat. These solutions, however, have several drawbacks. First, the higher power ratings or additional heating elements increase the cost of the toasters. Second, the additional power can result in over-heating or burning the products. Third, the power requirements of the conveyor toasters are increased, thereby increasing operating costs.

SUMMARY

One embodiment of the invention relates to a toaster. The toaster includes a housing, a conveyor configured to support food products, a motor configured to drive the conveyor to move the food products through the housing, a heating element disposed adjacent the conveyor and configured to emit thermal energy toward the food products as the food products are moved through the housing, a temperature sensor configured to sense a temperature within the housing, and a controller operatively coupled to the temperature sensor and configured to control the motor to drive the conveyor at a conveyor speed. The controller is configured to store the sensed temperature within the housing as a function of time and calculate a derivative of the sensed temperature with respect to time. The controller is configured to vary the conveyor speed based on a value of the derivative.

Another embodiment of the invention relates to a control system for a toaster including a motor configured to drive a conveyor to move food products past a heating element. The control system includes a temperature sensor configured to sense a temperature within a housing of the toaster and a controller operatively coupled to the temperature sensor and configured to control the motor to drive the conveyor at a conveyor speed. The controller is configured to store the sensed temperature within the housing as a function of time and calculate a derivative of the sensed temperature with respect to time. The controller is configured to vary the conveyor speed based on a value of the derivative.

Yet another embodiment of the invention relates to a method of controlling a speed at which a motor drives a conveyor to move food products through a toaster. The method includes sensing a temperature within the toaster at multiple points in time, storing the sensed temperature as a function of time, calculating a derivative of the sensed temperature with respect to time, determining an output speed of the motor based on a value of the derivative, and controlling the speed of the motor to operate at the output speed.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION

Figure 2:
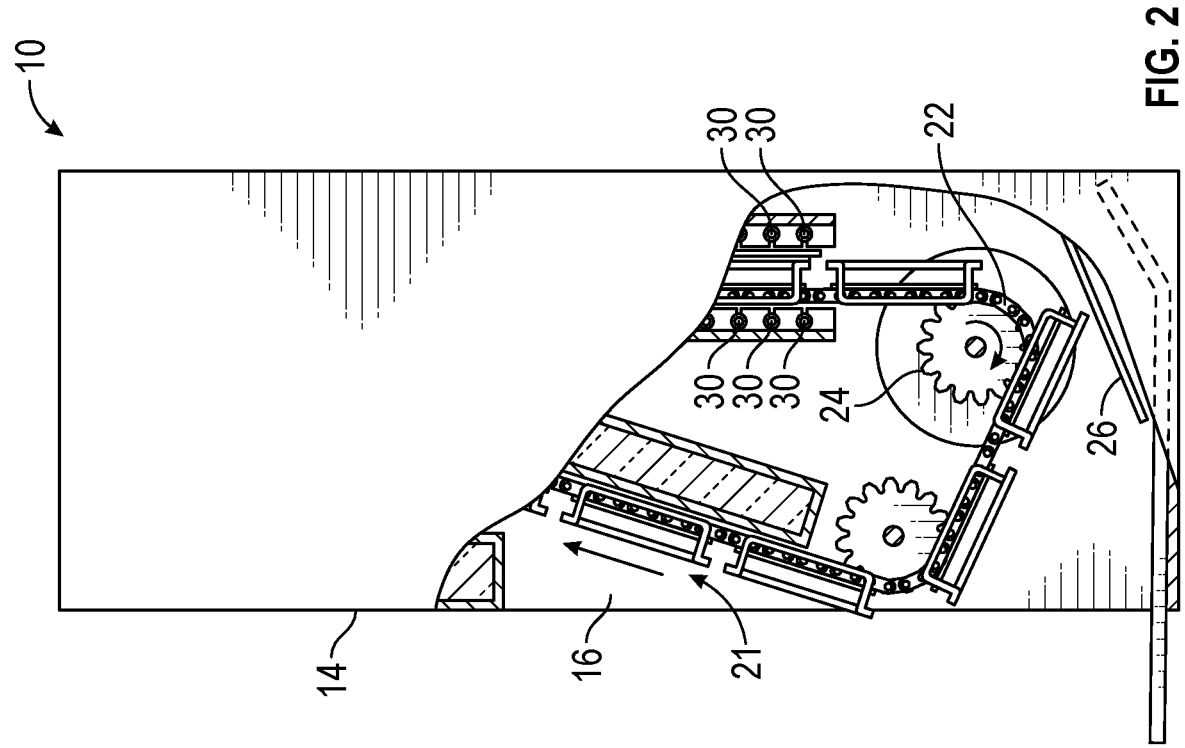
FIG. 2 is a partial section side view of the oven shown in FIG. 1 along the line 2, according to an exemplary embodiment.
Figure 1:
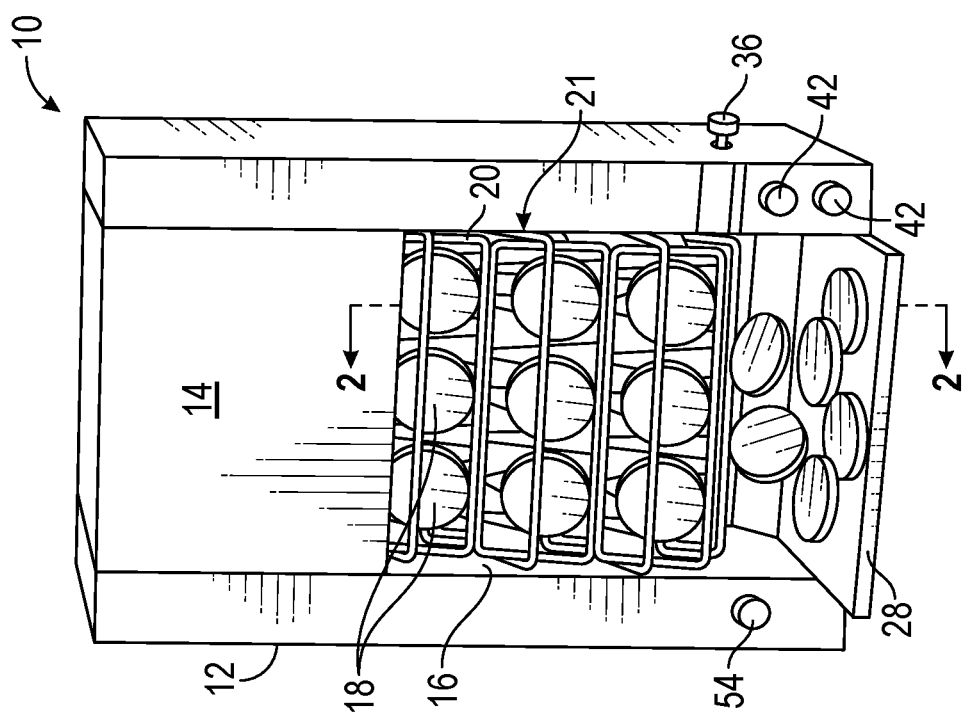
FIG. 1 is a perspective view of a conveyor toaster including a housing and a conveyor that moves baskets adjacent to heating elements mounted within the housing, according to an exemplary embodiment.

Referring to FIGS. 1 and 2, a conveyor oven (e.g., a toaster, etc.), shown as conveyor toaster 10, includes a housing, shown as housing 12, having an insulated front wall 14 with an aperture 16 through which food products 18 are inserted into food-carrying baskets 20 of a conveyor 21. The top, sides, and back of the housing 12 are insulated. The baskets 20 are coupled to a pair of continuous chains 22 which move the baskets 20 into a toasting zone within the conveyor toaster 10. The chains 22 are supported by rotatable sprockets 24 driven by a motor (e.g., a shaded pole AC electric gear-type motor connected to a drive shaft, another variant of electric motor, a DC motor, etc.). A clutch and gear assembly may be provided between the motor and the sprockets 24 to drive the conveyor in the clockwise direction as shown in FIG. 2. The baskets 20 include an open-wire framework configured to retain the food products 18 in place while being moved through the conveyor toaster 10. In other embodiments, the conveyor toaster 10 includes other types of conveyors 21 that transfer food products 18 through the conveyor toaster 10. By way of example, the conveyor 21 may include a belt onto which the food products 18 are laid.

In operation, the food products 18 may be inserted through the aperture 16 for retention within the baskets 20. The baskets 20 are moved by the conveyor 21 through the toasting zone of the conveyor toaster 10. The food products 18 reaching the bottom of the conveyor 21 fall from baskets 20 onto a slanted wall 26, where they are guided into a receiving tray 28 for removal.

Figure 3:
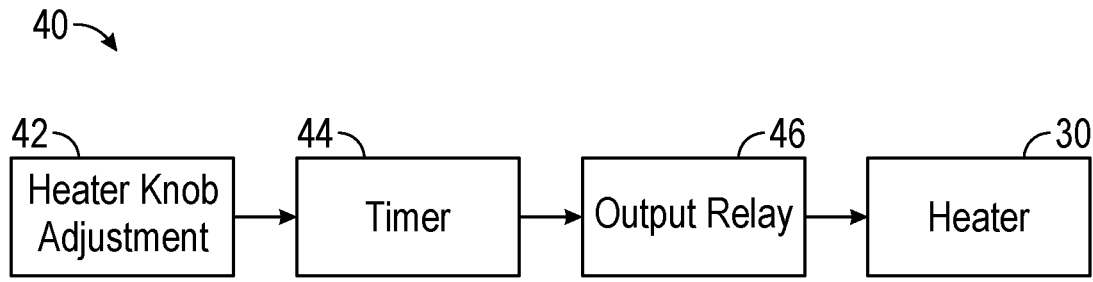
FIG. 3 is a block diagram of a heater element control for a conveyor toaster, according to an exemplary embodiment.

Heating elements, shown as electric heating elements 30, are mounted within the housing 12 adjacent to the chains 22 such that the food products 18 retained within the baskets 20 are exposed to thermal energy (i.e., heat) (such as convective or radiant) emitted by the elements 30. The configuration of the elements 30 depends on the application, however the elements 30 are preferably configured into two banks, one on either side of the conveyor 21, to provide heating to both sides of the food product 18 as it travels through the conveyor toaster 10. The elements 30 may be metal-sheathed electric heating elements, although other types of heating elements (e.g. quartz tube heaters) may be used. The elements 30 typically require a significant time period to reach their operating temperatures after turn on. The operation of the elements 30 may be controlled by a heater control system 40 as shown in FIG. 3 including a manually selectable heater input adjustment 42 (such as a knob interfacing with a timer 44) that provides an energize time demand in the range of zero (0) to one hundred (100) percent for energizing the elements 30 for a portion of the timer 44 duty cycle. The heater adjustment input 42 preferably interfaces with a potentiometer that provides an adjustable signal to a microprocessor, shown in FIG. 4 as controller 55, which provides a corresponding output signal to the timer 44 in a linear relationship over the full adjustment range. In a particularly preferred embodiment, the heater adjustment input 42 may be positioned such that full rotation in one direction provides a zero (0) percent energize time demand to the timer 44 and full rotation of the heater adjustment input 42 in the opposite direction provides a one hundred (100) percent energize time demand to the timer 44. The timer 44 may interface directly with an output relay 46 for switching electrical power on and off to the elements 30.

The controller 55 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 4, the controller 55 includes memory storage, shown as memory device 56, and a processing circuit, shown as processor 57. The processor 57 may include an ASIC, one or more FPGAs, a DSP, circuits containing one or more processing components, circuitry for supporting a microprocessor, a group of processing components, or other suitable electronic processing components. In some embodiments, the processor 57 is configured to execute computer code stored in the memory device 56 to facilitate the activities described herein. The memory device 56 may be any volatile or non-volatile computer-readable storage medium capable of storing data or computer code relating to the activities described herein. According to an exemplary embodiment, the memory device 56 includes computer code modules (e.g., executable code, object code, source code, script code, machine code, etc.) configured for execution by the processor 57. In some embodiments, the controller 55 represents a collection of processing devices (e.g., servers, data centers, etc.). In such cases, the processor 57 represents the collective processors of the devices, and the memory device 56 represents the collective storage devices of the devices.

In a particularly preferred embodiment, the timer 44 and the relay 46 control the supply of electric power to the elements 30 on a five (5) second duty cycle such that the elements 30 are energized for the energize time demand selected by the position of the heater adjustment input 42 and then de-energized for the remaining portion of the five (5) second duty cycle. For example, if the heater adjustment input 42 is set at a level corresponding to fifty (50) percent, then the timer 44 and the relay 46 will alternately energize the elements 30 for 2.5 seconds and de-energize the elements 30 for 2.5 seconds in a continuing cycle. If the heater adjustment input 42 is set at a level corresponding to sixty (60) percent, then the timer 44 and the relay 46 will alternately energize the elements 30 for three (3) seconds and de-energize the elements 30 for two (2) seconds in a continuous cycle. As the setting of the heater adjustment input 42 is increased, the amount of time that the elements 30 are energized increases in a corresponding linear manner to increase the intensity of heat provided at the elements 30 for heating food products 18. In a particularly preferred embodiment, two sets of heater controls may be provided, one for each bank of the elements 30, so that each bank of the elements 30 may be independently controlled to provide greater flexibility for heating a wide variety of food products 18. For example, if the food product 18 is a bun, the bank of the elements 30 facing the cut-side of the bun may be operated at a higher energize time demand and correspondingly greater heat intensity, while the bank of the elements 30 facing the uncut side of the bun may be operated at a lower energize time demand and a correspondingly lesser heat intensity. In alternative embodiments, timers with duty cycles having time periods other than five (5) seconds may be selected or programmed for use depending on the characteristics of the product to be heated and customized for optimum performance with the type of heater elements being used.

The extent to which food products 18 are heated or toasted by the conveyor toaster 10 depends upon the speed of the conveyor 21, and upon which of the elements 30 are turned on and their power level settings. The operator can adjust the conveyor speed using a motor speed adjustment input device 54, which is shown in FIG. 1 as a knob. The on/off and power rating configuration of the elements 30 are selected for a particular toaster. In some toasters, different configurations are selected by the operator depending on the type of food or other products being heated. The conveyor speed is controlled as described below. The conveyor toaster 10 may also be equipped with a manual advance knob 36 to manually advance the conveyor 21.

Figure 5:
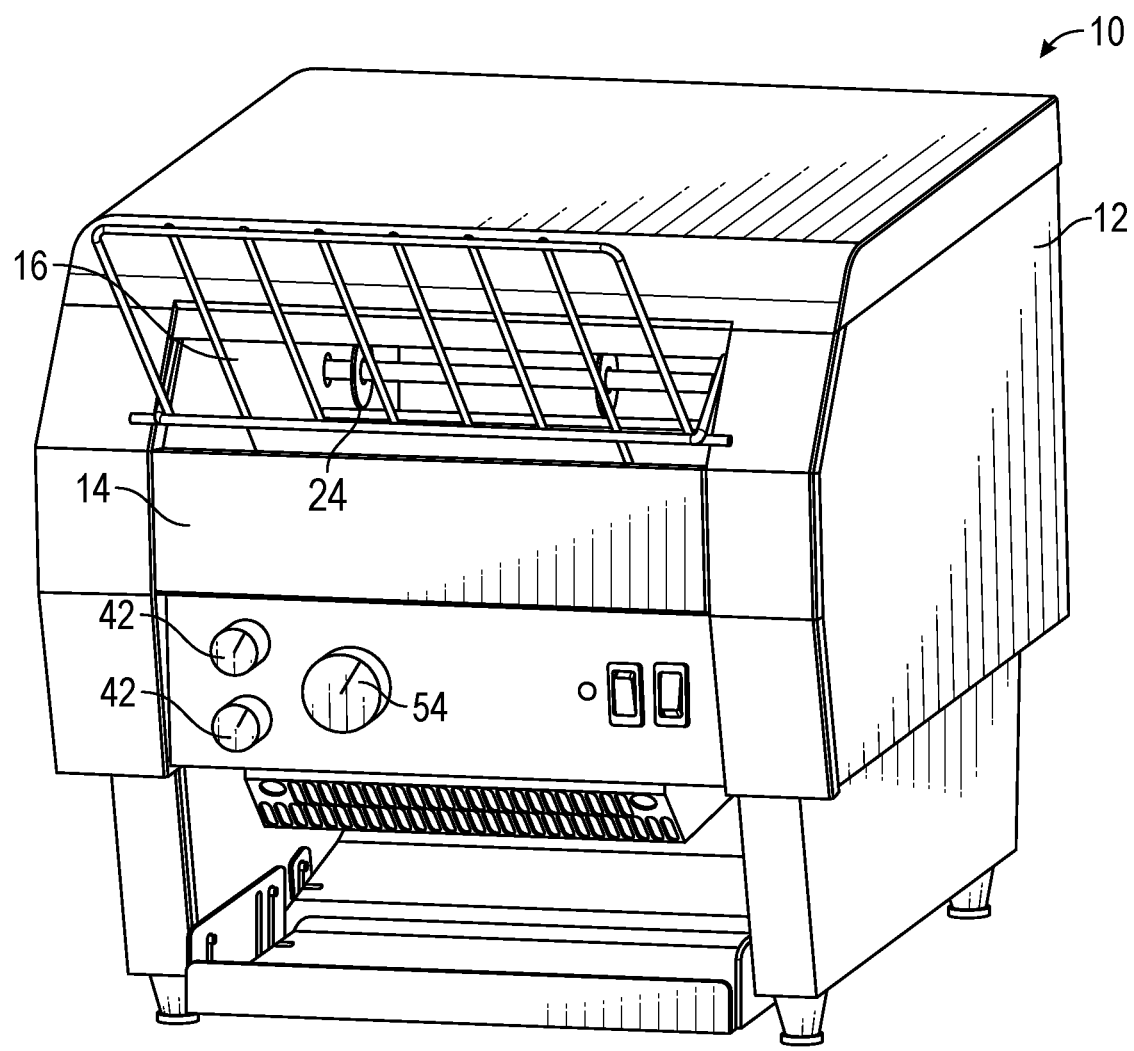
FIG. 5 is a perspective view of another conveyor toaster adaptable for use with the control system, according to an exemplary embodiment.
Figure 6:
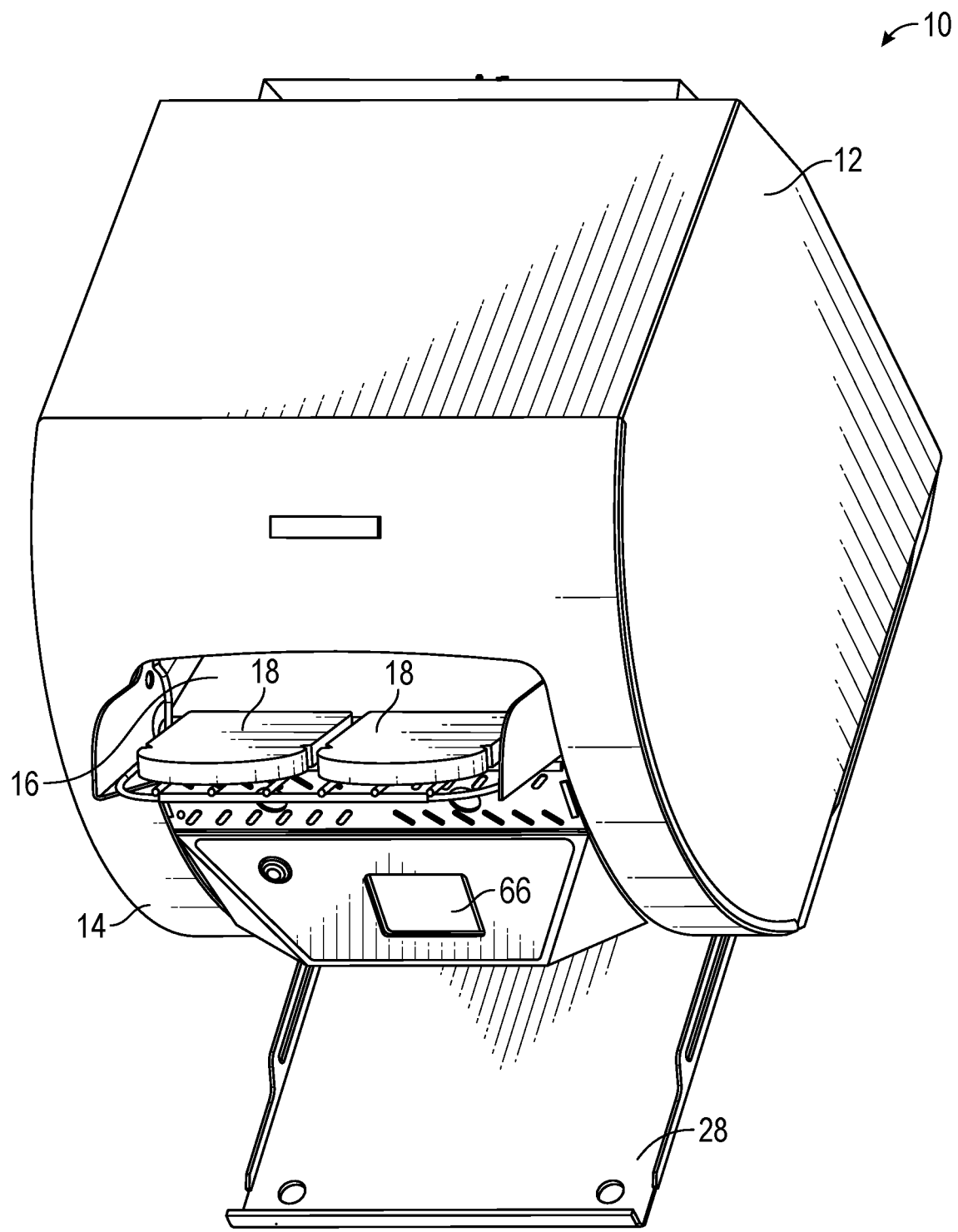
FIGS. 6-10 are various views of another conveyor toaster adaptable for use with the control system, according to various exemplary embodiments.
Figure 7:
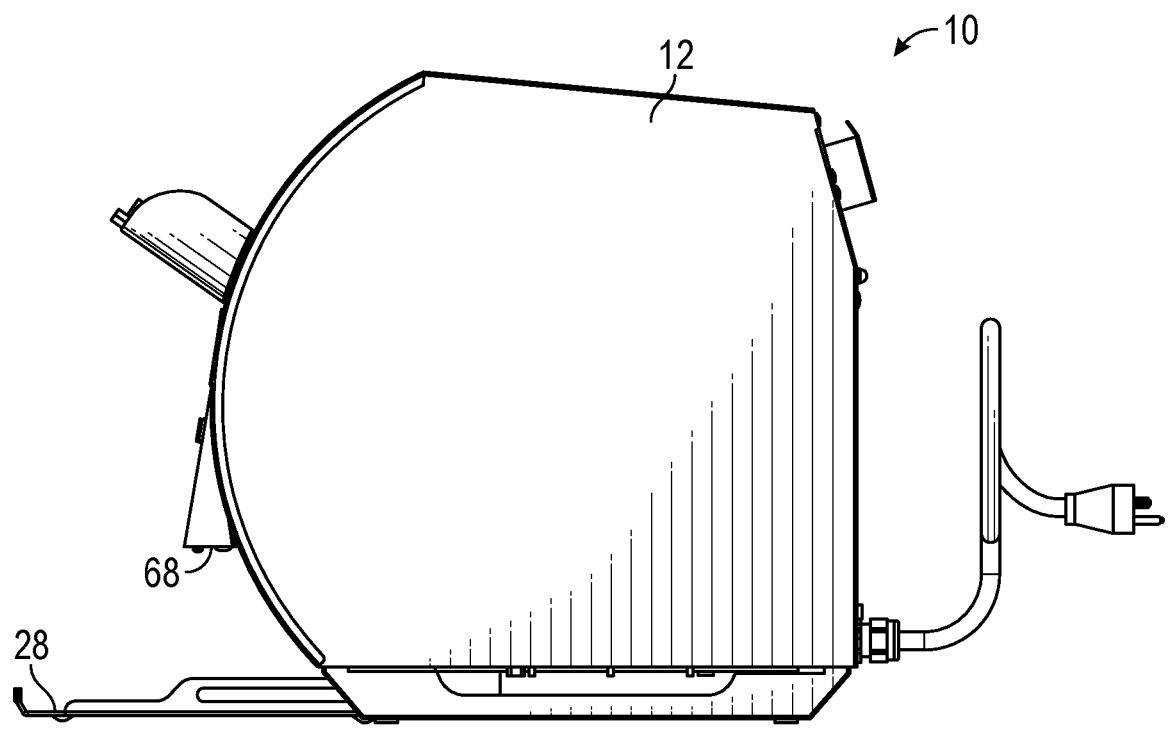
Figure 8:
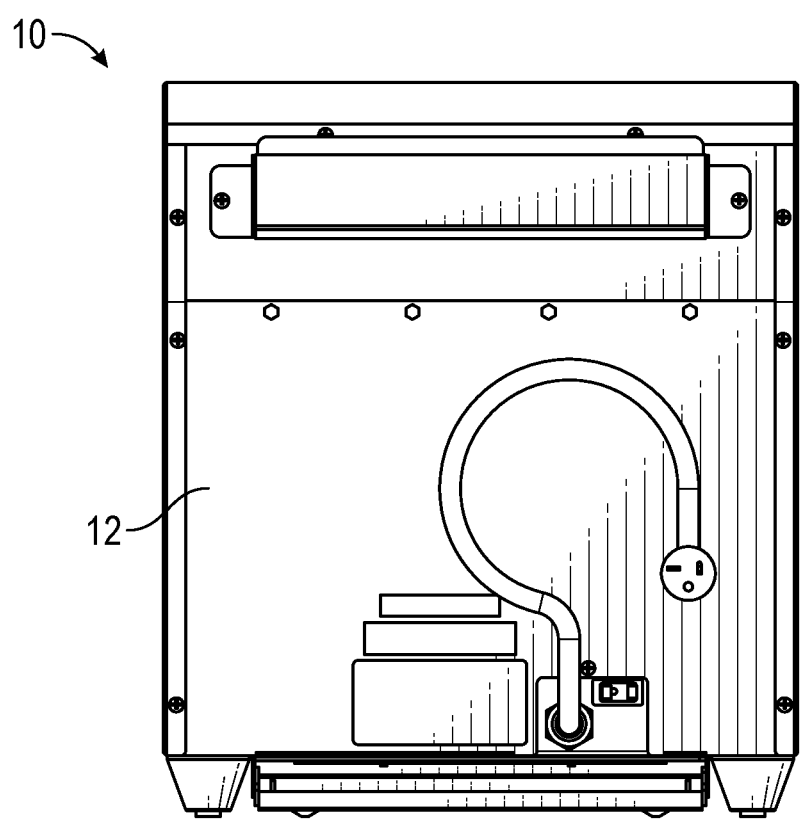
Figure 9:
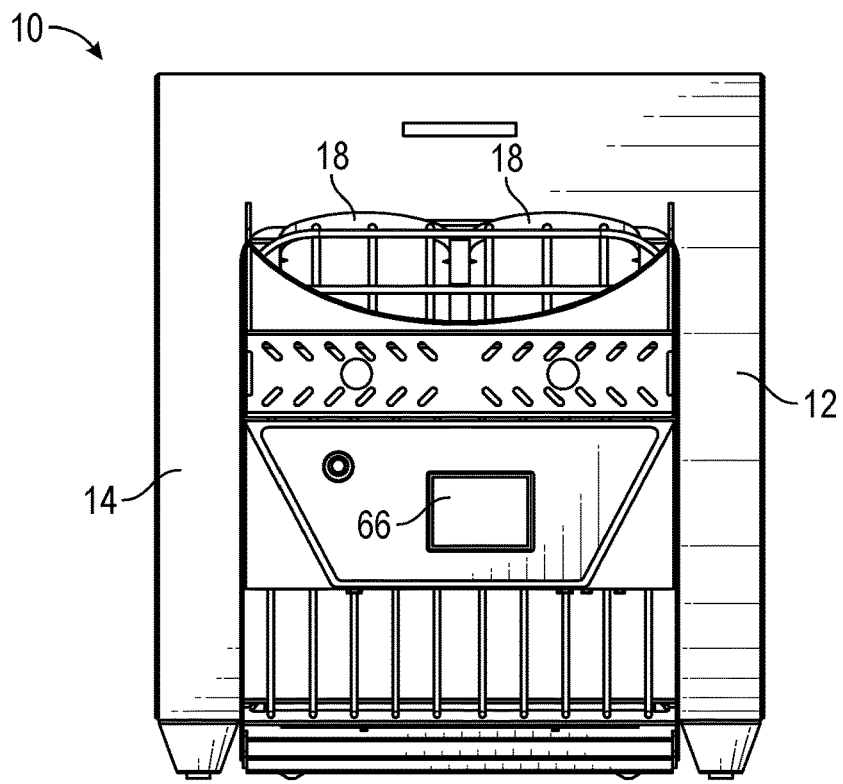
Figure 10:
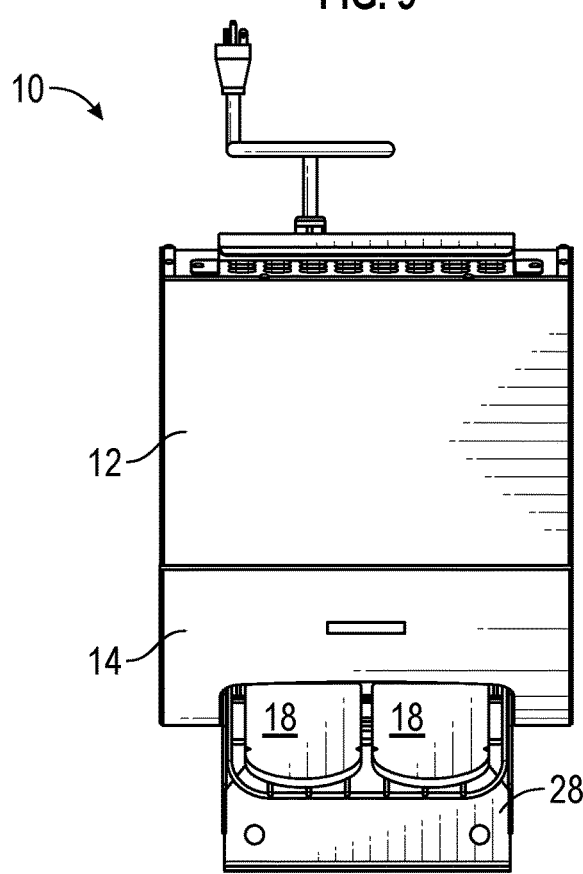

The conveyor toaster 10 described herein is similar to the TK-100 and TK-105E conveyor toaster made by Hatco Corp. of Wisconsin, except for the speed control system 50 described below. The speed control system 50 can also be used in other exemplary conveyor toasters having a motor-driven conveyor for carrying food or other products in close proximity to one or more banks of heating elements, such as the TQ-300 shown schematically in FIG. 5, the TQ-700 series conveyor toaster made by Hatco Corp, the TQ3 series conveyor toaster shown schematically in FIGS. 6-10, or similar toasters made by other suppliers. In other embodiments, these control systems are provided as part of a conveyor oven that heats food (i.e., rather than toasting), processes other types of food (e.g. conveyorized pizza ovens), or processes non-food products (e.g. ovens for curing rubber or drying ink).

Figure 4:
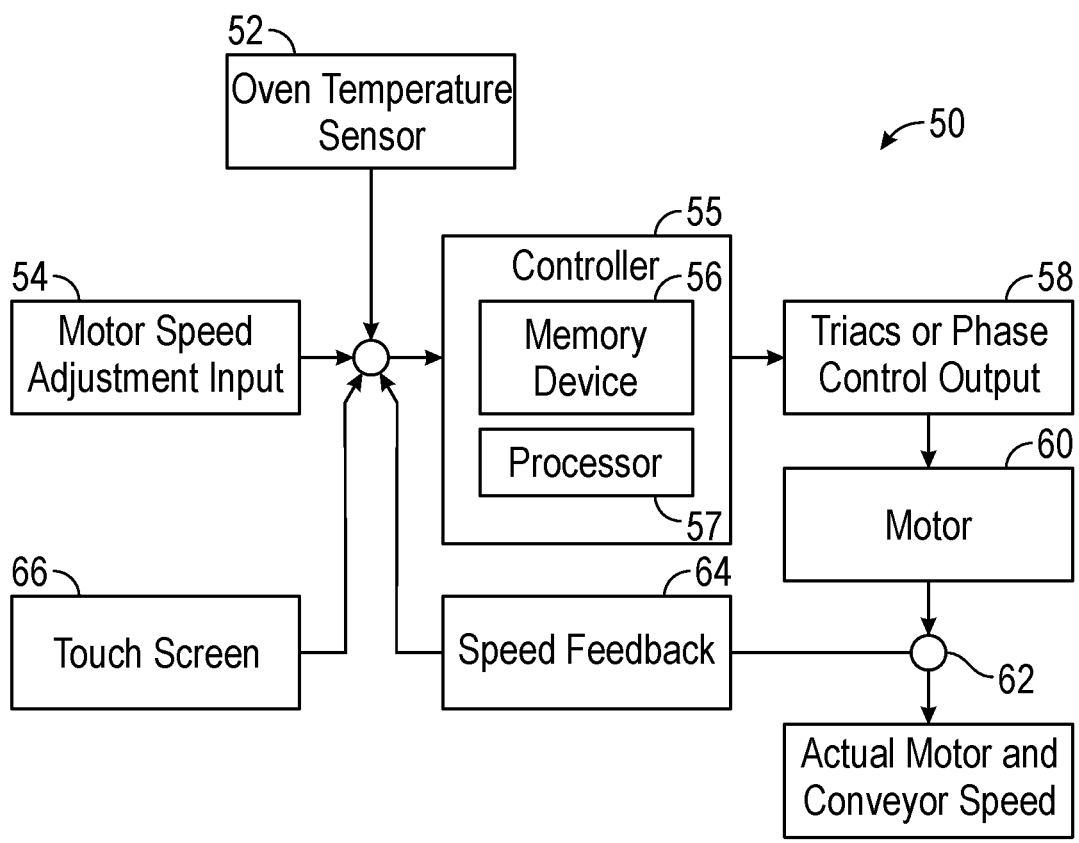
FIG. 4 is a block diagram of a control system for a conveyor toaster, according to an exemplary embodiment.

Referring to FIG. 4, in the conveyor toaster 10, the conveyor speed is controlled by a speed control system 50 according to an exemplary embodiment. The conveyor speed is dependent on a speed of the motor 60. The speed control system 50 determines an output speed of the motor 60 (e.g., using the method 100 of FIG. 11) and controls the motor 60 to reach the output speed. The speed control system 50 includes a temperature sensor 52 (such as a thermocouple, a resistance temperature detector, etc.). The temperature sensor 52 is preferably a type K thermocouple, but may be a thermocouple using other bimetallic materials. Alternatively the temperature sensor 52 may be a resistance temperature detector of the 1000 OHM or 100 OHM platinum type having suitable accuracy within a range of ambient temperature to 650 degrees Fahrenheit. The temperature sensor 52 may be configured to sense a temperature within the housing 12 (i.e., an oven temperature). The speed control system 50 also includes a motor speed adjustment input device 54 that may be a rotary knob interfacing with a potentiometer. With the knob at one end of its travel range, a minimum motor speed signal is provided, and with the knob at the other end of its travel range, a maximum speed signal is provided. Alternatively, the speed adjustment input device 54 may be a slide knob interfacing with a rheostat. The motor 60 is provided to drive the conveyor 21, and is preferably an electric, alternating current (AC), shaded, pole-type gear motor. This type of motor is typically intended to operate at one speed according to the setting provided by speed adjustment input device 54, and without feedback, whereby the motor speed may not be linear with a range of speed input adjustment settings. To facilitate the motor 60 operating at reduced speeds and to provide linear adjustment of speed control, the speed control system 50 includes a motor speed sensor 62 capable of providing a feedback signal 64, such as a tachometer, but preferably a hall effect sensor, to monitor and feedback motor speed information to the speed control system 50 to provide closed-loop, linear speed control when changing the setting of the speed adjustment input device 54. Linear speed adjustment is preferred so that uniform, incremental changes to the speed adjustment input device 54 result in correspondingly uniform changes in motor speed. However, in alternative embodiments, a motor speed sensor may be omitted and motor speed changes may be non-linear in relation to speed adjustment input changes and non-linear control techniques and/or heuristics may be used.

The controller 55 controls the speed of the motor 60 by modulating the AC wave form (of the sine-wave type), using triacs 58, such that each time the AC wave form supplied to the motor 60 crosses through zero (0) volts, a zero-cross interrupt is generated. An algorithm programmed in the controller 55 compares the output signal of the controller 55 to the zero-cross interrupt for each wave form cycle and controls the triacs 58 for raising or lowering the supply voltage (and corresponding power) to the motor 60. The algorithm includes a table of full voltage and reduced voltage cycle patterns. One exemplary pattern would provide four (4) full voltage cycles followed by two (2) reduced voltage cycles which cause the motor 60 to run at a certain reduced speed. Other patterns are developed corresponding to other desired reduced motor speeds. In an alternative embodiment, the motor speed may be controlled by methods such as phase control, where a triac 58 is used to completely block voltage supplied to the motor 60 for a portion of each half cycle of the fifty (50) or sixty (60) hertz wave form. The length of the zero (0) voltage portion of the wave form may be controlled by a potentiometer adjustment where the longer the voltage is blocked, the slower the motor 60 will run.

Referring to FIG. 4, the controller 55 preferably receives input signals from the speed adjustment input device 54, the temperature sensor 52, and the motor speed sensor 62 and provides an output signal to control the speed of the motor 60. The conveyor toaster 10 may include an operator interface, shown in FIGS. 4, 6, and 9 as touchscreen 66, that provides an additional input signal to the controller 55. An operator may use the touchscreen 66 to select any of a number of operating parameters for the conveyor toaster 10 including, but not limited to, the type of food product 18 to be heated (e.g., bread, muffins, bagels, etc.), a desired speed of the conveyor 21, and an energize time demand for the elements 30. Accordingly, the touchscreen 66 may act as the heater adjustment input 42 and/or the speed adjustment input device 54. Additionally, the touchscreen 66 may be used by the operator to issue a command to the controller 55 to start up or shut down the conveyor toaster 10. Further, the touchscreen 66 may be used to communicate information to an operator. By way of example, the touchscreen 66 may indicate to the operator when a portion of the conveyor toaster 10 requires maintenance, a current temperature of the conveyor toaster 10, and/or the current operator settings. In some embodiments, the controller 55 includes additional inputs for refining control system operation such as a timer and information relating to the number of elements 30 in operation. The memory device 56 may be accessed (e.g., through the port 68 shown in FIG. 7, which may be any type of port such as a Universal Serial Bus (USB) port) to permanently store information such as the operating voltage of the conveyor toaster 10, the width of the toasting area, or data relating to the performance of the conveyor toaster 10 under certain operator settings.

Figure 11:
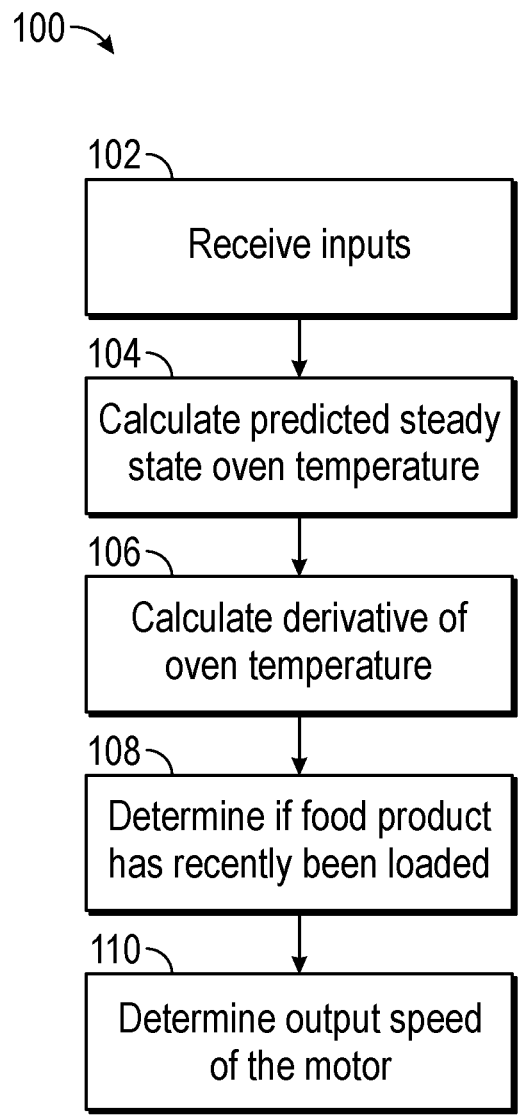
FIG. 11 is a block diagram illustrating a method of determining a desired output speed of a motor of a conveyor toaster, according to an exemplary embodiment.

Throughout the operation of the conveyor toaster 10, the controller 55 may determine the output speed of the motor 60 according to a method 100, shown in FIG. 11. The method 100 adjusts or compensates the speed setting received from the speed adjustment input device 54 or the touchscreen 66 when determining the output speed to ensure a uniform heating of each food product 18. The method 100 may be repeated continuously throughout the operation of the conveyor toaster 10. In step 102 of the method 100, the controller 55 receives and/or accesses each of the inputs and other various information described herein.

In step 104 of the method 100, the controller 55 determines a predicted steady state oven temperature for use in other calculations. In some embodiments, an algorithm programmed into the controller 55 determines the predicted steady state oven temperature using (e.g., as a function of) inputs such as the power level of the conveyor toaster 10 (e.g., the rated wattage, the electrical power received by the conveyor toaster 10 during operation), an input voltage received by the conveyor toaster 10 (e.g., the rated voltage, the voltage of the electrical power received by the conveyor toaster 10 during operation), various thermal characteristics of the conveyor toaster 10, and the current operator settings. The controller 55 may alternatively access predicted steady state oven temperature data corresponding to various input combinations stored in the memory device 56. The predicted steady state oven temperature data may be factory-set or may be created and stored during operation. The controller 55 may be configured to use the predicted steady state oven temperature stored in the memory device 56 that most closely corresponds to the current operating conditions of the oven. Alternatively, the controller 55 may determine the predicted steady state oven temperature empirically by experimentation. By way of example, the controller 55 may average the normal running oven temperature over a suitable time period, preferably five minutes.

In step 106 of the method 100, the controller 55 continuously determines (e.g., 10 times per second, once per second, etc.) a derivative (i.e., a rate of change) of the oven temperature using temperature information from the temperature sensor 52. The controller 55 is configured to store the oven temperature information as a function of time in the memory device 56. By way of example, the controller 55 may be configured to store the oven temperature at 0.5 second time intervals along with the time at which the oven temperature measurement was taken (e.g., at 0.5 seconds, at 1 second, at 2 seconds, etc.). Accordingly, the controller 55 may include a timer or other component configured to facilitate time measurement. In one embodiment, the controller 55 determines the derivative of the oven temperature by dividing the change in oven temperature over a predefined time interval by the length of the predefined time interval. The controller 55 may alternatively utilize other known derivative calculation methods. The controller 55 may utilize the derivative of the oven temperature to determine when food products 18 are loaded into the conveyor toaster 10 (i.e., when a change in the amount of food products 18 being heated has occurred). By way of example, upon detecting a relatively sharp decrease in oven temperature (corresponding with a negative derivative) during a situation where the oven temperature is expected to be rising or constant (e.g., the conveyor toaster 10 was recently turned on, the conveyor toaster 10 was previously operating at a steady state oven temperature, etc.), the controller 55 may determine that a new load of food products 18 has been added. By way of another example, upon detecting a fairly constant oven temperature (corresponding with a derivative near zero), the controller 55 may determine that the oven temperature is approximately at steady state and that no food product has recently been added. By way of yet another example, upon detecting an increasing oven temperature (corresponding with a positive derivative), the controller 55 may determine that the oven temperature is recovering from a decrease in temperature (e.g., from the oven being turned off, from a load of food products 18 being added, etc.) and moving towards a steady state oven temperature.

In step 108 of the method 100, the controller 55 uses the derivative of the oven temperature to determine when one or more food products 18 have been loaded into the conveyor toaster 10. In an alternative embodiment, the conveyor toaster 10 includes an additional sensor used to determine when a food product 18 is being loaded instead of using the derivative of the oven temperature. By way of example, an infrared sensor can be used to determine when a food product 18 enters through the aperture 16. The controller 55 determines the output speed using a loaded compensation formula when the controller 55 has determined that one or more food products 18 have recently been loaded and using an unloaded compensation formula when the controller 55 has determined that no food products 18 have recently been loaded. The motor speed compensation formulas modify the output speed of the motor 60 to be less than or equal to the motor speed setting selected by the operator using the speed adjustment input device 54 or the touchscreen 66, ensuring that the food products 18 are heated consistently irrespective of the operating conditions of the conveyor toaster 10. This facilitates the conveyor toaster 10 producing a consistently heated product in all situations, such as after changing operator settings, after an initial cold startup, after a food product 18 is loaded into the unit, or a combination thereof.

In some embodiments, the controller 55 uses the loaded formula when the derivative of the oven temperature is less than a predetermined threshold value, and otherwise uses the unloaded formula. In some embodiments, the controller 55 is configured to use the loaded formula for a period of time after the derivative drops below the predetermined threshold value. In some embodiments, the threshold value is zero such that the controller 55 uses the loaded formula in response to any decrease in oven temperature. In other embodiments, the threshold value is a negative value such that the controller 55 uses the loaded formula after the oven temperature has decreased at above a threshold rate.

In other embodiments, the controller 55 is configured to calculate a predicted derivative of the oven temperature based on the operating conditions of the conveyor toaster 10. The predicted derivative may have a specific value (e.g., −0.5 degrees per second, 0 degrees per second, etc.) or may include a range of values (e.g., between 0.5 and 1 degrees per second, above 0 degrees per second such that the oven temperature is predicted to be increasing, etc.). The operating conditions of the conveyor toaster 10 may include one or more of if the conveyor toaster 10 is in a heatup operation (e.g., when the conveyor toaster 10 has recently been turned on), if the conveyor toaster 10 is in a cooling down operation (e.g., when the conveyor toaster 10 is shutting down), the predicted steady state temperature, the oven temperature, and the current operator settings. In some such embodiments, the controller 55 compares the derivative of the oven temperature with the predicted derivative when selecting between the loaded and unloaded formulas. By way of example, the controller 55 may predict a certain positive derivative of the oven temperature when first turned on. By way of another example, the controller 55 may predict a certain range of positive derivatives of the oven temperature when the current oven temperature is below the predicted steady state oven temperature. By way of another example, the controller 55 may predict a certain range of negative derivatives of the oven temperature after an operator changes to a setting corresponding to a lesser predicted steady state oven temperature. The controller 55 may use the loaded formula when the derivative of the oven temperature is a threshold amount below the predicted derivative of the oven temperature. When the derivative of the oven temperature does not match the predicted derivative (e.g., is not within the predicted range of derivatives, etc.), this may indicate that food product 18 has recently been added. In yet other embodiments, the controller 55 uses the derivative of the oven temperature in another way to determine when to change between the loaded and unloaded formulas.

In step 110 of the method 100, the controller 55 applies the loaded or unloaded motor speed compensation formula to determine an output speed of the motor 60 (e.g., a speed desired by the controller 55). The unloaded and loaded motor speed compensation formulas may be functions of any information available to the controller 55. In some embodiments, the unloaded motor speed compensation formula is a function of the predicted steady state temperature, the current oven temperature, the current operator settings, and the thermal characteristics of the conveyor toaster 10. In some embodiments, the loaded motor speed compensation formula is a function of the derivative of the oven temperature, the current oven temperature, and the current operator settings. By way of example, the loaded compensation formula may output a lower output speed for a high magnitude, negative derivative of oven temperature than for a low magnitude, negative derivative of oven temperature.

In some embodiments, the controller 55 is configured to output an output speed equal to the speed setting indicated by the operator using the speed adjustment input device 54 when no food products 18 have recently been loaded and the oven temperature is within a certain range of the predicted steady state oven temperature. When the controller 55 determines that one or more food products 18 have recently been loaded and/or that the oven temperature is a threshold amount below the predicted steady state temperature, the controller 55 may still scale the output speed with the speed setting indicated by the operator using the speed adjustment input device 54. In some embodiments, the loaded motor speed compensation formula outputs a lower output motor speed than the unloaded motor speed compensation formula for a given set of operating conditions (e.g., where the current oven temperature, operator settings, predicted steady state temperature, and thermal characteristics of the conveyor toaster 10 are the same). This compensates for the decreased oven temperature from loading cold food products 18 into the conveyor toaster 10. The loaded and unloaded formulas may decrease the output speed of the motor 60 as the current oven temperature decreases further below the predicted steady state temperature. The loaded and unloaded formulas may increase the output speed of the motor 60 as the current oven temperature approaches the predicted steady state oven temperature. The loaded and unloaded formulas may change depending upon if the conveyor toaster 10 is in a heatup operation or cooldown operation (e.g., if the operator has recently commanded the conveyor toaster 10 to turn on or shut off, respectively), on the type of food product 18 being heated, and/or on specific characteristics or specifications of the conveyor toaster 10 (e.g., whether the conveyor toaster 10 has a one slice or two slice wide capacity, whether the conveyor toaster 10 operates on a 120 volt or a 208 volt power source, etc.). Information regarding the specific characteristics of the conveyor toaster 10 may be stored in the memory device 56 of the controller 55.

The controller 55 may also be configured to provide a standby mode of operation to reduce power consumption by the elements 30 and conserve energy during time periods when the conveyor toaster 10 will not be used for heating food products 18. In the standby mode of operation, the conveyor toaster 10 consumes less power than it does in a normal mode of operation, in which the conveyor toaster 10 is configured to toast or warm food products 18. In the standby mode of operation, the elements 30 cycle between an energized condition (i.e. "on") and a de-energized condition (i.e. "off") and an indicator (such as a flashing lamp or LED display, the touchscreen 66, etc.) may provide an indication to an operator of the standby mode status. The duration of time during which the elements 30 are energized and de-energized may be user-programmable or may be factory-set. The controller 55 may interface with a selector switch, such as a dual in-line packet (DIP) switch or other suitable switch device, for providing both manual and automatic control capability for the standby mode. During the manual standby mode, the selector switch bypasses the automatic mode in the controller 55 and facilitates direct operator selection of standby mode entry using a separate switch that operates between the normal mode and the standby mode. During the automatic standby mode, the selector switch bypasses the manual mode and the controller 55 will automatically enter the standby mode when the deviation in steady state oven temperature remains within a preset temperature range for a threshold period of time. Alternatively, during the automatic standby mode, the selector switch bypasses the manual mode and the controller 55 will automatically enter the standby mode when the derivative of the oven temperature remains within a preset range (e.g., a certain amount away from zero) for a threshold period of time.

In a particularly preferred embodiment, the controller 55 is fabricated on a board made of a fiberglass material and conformal coated with materials approved by the Underwriters Laboratory. The controller 55 is preferably capable of withstanding operating environment conditions of seventy 70 degrees Celsius and ninety-five percent (95%) relative humidity and is located within an area of the housing 12 that is shielded from the elements 30 and cooled by the airflow from a conventional housing cooling fan. The controller 55 is also preferably immune to permanent damage from voltage spikes or transients, but may be provided with an automatic reset function following voltage transients provided that no data loss or perceptible change in operation occurs.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from the scope of the present disclosure or from the spirit of the appended claim.

What is claimed is:

1. A toaster, comprising:
   a housing;
   a conveyor configured to support food products;
   a motor configured to drive the conveyor to move the food products through the housing;

a heating element disposed adjacent the conveyor and configured to emit thermal energy toward the food products as the food products are moved through the housing;
a temperature sensor configured to sense a temperature within the housing; and
a controller operatively coupled to the temperature sensor and configured to:
control the motor to drive the conveyor at a conveyor speed;
store the sensed temperature within the housing as a function of time;
calculate a derivative of the sensed temperature with respect to time;
vary the conveyor speed according to a first motor speed compensation formula;
determine a predicted derivative of the sensed temperature based on current operating conditions of the toaster;
determine that a change in an amount of food products being heated has occurred in response to comparing the derivative to the predicted derivative; and
vary the conveyor speed according to a second motor speed compensation formula in response to a determination that the amount of food products being heated has changed.

2. The toaster of claim 1, further comprising a speed adjustment input device operatively coupled to the controller, wherein the speed adjustment input device is configured to provide a speed setting for the motor, and wherein the controller is configured to vary the conveyor speed based on the speed setting.

3. The toaster of claim 1, wherein the controller is configured to determine a predicted steady state temperature within the housing, and wherein the controller is configured to vary the conveyor speed based on the predicted steady state temperature.

4. The toaster of claim 1, wherein the controller is configured to vary the conveyor speed based on at least one of (a) if the toaster is in a heatup operation, (b) if the toaster is in a cooldown operation, (c) a type of the food products being heated, and (d) specifications of the toaster.

5. The toaster of claim 4, wherein the controller is configured to vary the conveyor speed based on if the toaster is in the heatup operation.

6. The toaster of claim 4, wherein the controller is configured to vary the conveyor speed based on if the toaster is in the cooldown operation.

7. The toaster of claim 4, wherein the controller is configured to vary the conveyor speed based on the type of the food products being heated.

8. The toaster of claim 4, wherein the controller is configured to vary the conveyor speed based on the specifications of the toaster.

9. The toaster of claim 1 wherein the first motor speed compensation formula is a function of a first set of inputs, and wherein the second motor speed compensation formula is a function of a second set of inputs different from the first set of inputs.

10. The toaster of claim 9, wherein the first set of inputs includes at least one of a predicted steady state temperature within the housing, a current temperature within the housing, a current operator setting, or a thermal characteristic of the toaster.

11. The toaster of claim 9, wherein the second set of inputs includes at least one of the derivative, a current temperature within the housing, or a current operator setting.

12. The toaster of claim 1, wherein the predicted derivative comprises a range of predicted derivatives, and the controller is configured to determine that the change in the amount of food products being heated has occurred in response to the derivative being outside of the range of predicted derivatives.

13. A control system for a toaster including a motor configured to drive a conveyor to move food products past a heating element, comprising:
a temperature sensor configured to sense a temperature within a housing of the toaster; and
a controller operatively coupled to the temperature sensor and configured to:
control the motor to drive the conveyor at a conveyor speed;
store the sensed temperature within the housing as a function of time;
calculate a derivative of the sensed temperature with respect to time;
vary the conveyor speed according to a first motor speed compensation formula;
determine a range of predicted derivatives of the sensed temperature based on current operating conditions of the toaster:
determine that a change in an amount of food products being heated has occurred in response to the derivative being outside of the range of predicted derivatives; and
vary the conveyor speed according to a second motor speed compensation formula in response to a determination that the amount of food products being heated has changed.

14. The control system of claim 13, further comprising a speed adjustment input device operatively coupled to the controller, wherein the speed adjustment input device is configured to provide a speed setting for the motor, and wherein the controller is configured to vary the conveyor speed based on the speed setting.

15. The control system of claim 13, wherein the controller is configured to determine a predicted steady state temperature within the housing, and wherein the controller is configured to vary the conveyor speed based on the predicted steady state temperature.

16. The control system of claim 13, wherein the controller is configured to vary the conveyor speed based on at least one of (a) if the toaster is in a heatup operation, (b) if the toaster is in a cooldown operation, (c) a type of the food products being heated, and (d) specifications of the toaster.

17. A method of controlling a speed at which a motor drives a conveyor to move food products through a toaster, comprising:
determining a first output speed of the motor according to a first motor speed compensation formula;
controlling the speed of the motor to operate at the first output speed;
sensing a temperature within the toaster at multiple points in time;
storing the sensed temperature as a function of time;
calculating a derivative of the sensed temperature with respect to time;
calculating a predicted derivative of the sensed temperature based on current operating conditions of the toaster;
determining that a change in an amount of food products being heated has occurred by comparing the derivative to the predicted derivative;

determining a second output speed of the motor according to a second motor speed compensation formula in response to a determination that the amount of food products being heated has changed; and controlling the speed of the motor to operate at the second output speed.

18. The method of claim 17, further comprising receiving a speed setting for the motor from a speed adjustment input device, wherein at least one of the first output speed or the second output speed of the motor is determined based on the speed setting.

19. The method of claim 17, further comprising:

determining a predicted steady state temperature within the toaster; and varying at least one of the first output speed or the second output speed based on the predicted steady state temperature.

20. The method of claim 17, wherein the predicted derivative comprises a range of predicted derivatives, and wherein comparing the derivative to the predicted derivative comprises:

determining if the derivative is outside of the range of predicted derivatives.

* * * * *